UNITED STATES PATENT OFFICE.

WILLIAM H. HARDING, OF PHILADELPHIA, PENNSYLVANIA.

ART OF MAKING HYDRAULIC CEMENTS, &c.

No. 908,093.   Specification of Letters Patent.   Patented Dec. 29, 1908.

Application filed April 30, 1908. Serial No. 430,163.

*To all whom it may concern:*

Be it known that I, WILLIAM H. HARDING, a citizen of the United States, and a resident of Philadelphia, in the county of Philadelphia and State of Pennsylvania, have invented certain new and useful Improvements in the Art of Making Hydraulic Cements, &c., of which the following is a specification.

My present invention relates more specifically to the production of Portland cement, though certain of its features and advantages may be utilized in connection with other processes involving the decomposition of minerals and the fritting or clinkering of the nonvolatile products of such decomposition.

The production of Portland cement necessarily involves the fritting or clinkering of an alkaline base, such as lime (CaO) with an acid of the class typified by silica ($SiO_2$) and alumina ($Al_2O_3$). Usually, the lime, silica, and alumina are all present in certain proportions, and the limits of variation in the percentage of each are now well recognized in the art. As the constituent materials are not found in nature in a free state, they are commonly prepared for the clinkering process by the burning of raw materials containing compounds thereof in suitable proportions and free from too great admixture of objectionable materials or elements which might interfere with the process or deteriorate the quality of the cement product.

If the natural materials available do not contain the constituents in proper proportion, a suitably proportioned mixture may be prepared either by using different materials, each containing one or more desired constituents, or by combining a material containing too great a proportion of one constituent with another material containing too great a proportion of another constituent.

The lime is commonly obtained from material containing calcium carbonate ($CaCO_3$), which is decomposed by heat into lime (CaO) and carbon dioxid gas ($CO_2$), and the silica and alumina are commonly obtained from materials in which they are found combined with water of crystallization, which is driven off by the heat.

Commonly the raw material is natural rock containing varying proportions of calcium carbonate and silica, commonly associated with alumina, magnesia, iron, etc. Usually, lime rock, chalk, or similar material, containing a greater lime content than is necessary for Portland cement is used in connection with so-called cement rock, clay, or other material containing an excess of silica, the proportions being such that the mixture when calcined and fritted or clinkered, will consist of a compound containing tri-calcium silicate and aluminate.

According to the universal practice, these raw materials are finely ground and intimately mixed, either wet or dry, prior to heating them to drive off the carbon dioxid and water from the lime, silica, and alumina. The double process, first of decarbonizing the calcium carbonate and dehydrating the silica and alumina, and, second, fritting or clinkering the resulting lime, silica, and alumina so that they may unite in the proper relation to form what is commonly supposed to be a "solid solution" of calcium silicates, aluminates, etc., is now and always has been performed by a single heat, both when the burning is done in an upright kiln and when it is done in a rotary kiln. It has long been recognized that the upright kiln is not well adapted for clinkering and that the rotary kiln is uneconomical, and it was proposed to completely dry and calcine the material in an upright kiln and then clinker it in a rotary kiln; but prior to my invention this method has been found to be practically impossible, and no one has ever succeeded in applying it commercially. Moreover, the proposition has been declared unsound, because the rotary kiln requires such great heat at the lower end for clinkering that any amount which can be absorbed in calcining further up the kiln is insignificant as compared with the total unavoidable waste. The result has been that the single burning operation with continuous calcining and clinkering in a rotary kiln has gradually become recognized and generally accepted as the standard modern method of making Portland cement, so that now practically all of the Portland cement made in this country is produced by this method, and the use of the upright kiln for Rosendale cement, has been due mainly to the demand for a cheaper, lower grade cement and to the preëxistence of the upright kiln plants and the expense involved in substituting rotary kilns.

My present invention consists of a method whereby the raw material instead of being calcined and clinkered at one heat, is subjected to two distinct burning operations in such manner and under such conditions as to have proved highly practical and economical, as well as productive of a good quality of Portland cement clinker.

Heretofore, it has been supposed that the method of burning cement in a rotary kiln would be improved if the decarbonization of all of the materials were made perfect before any of it is exposed to a clinkering temperature, but according to my experience with my process in which this is an easily obtainable condition, it is desirable that there be some uncalcined material, even though it be an extremely small percentage which remains to be decomposed in the rotary kiln, preferably so as to absorb heat at or near the region where the intensity of the applied heat begins to approach a temperature sufficient to clinker fully calcined material, to the end that the material shall not be too fully clinkered at a point too far up the kiln, as this would result in subjecting the clinker to clinkering temperature for too long a time. In fact, the clinkering operation in the continuous feed rotary kiln is most easily accomplished where the decarbonizing or calcining reaction is prolonged so that it will be taking place to some extent at least at or near the time and place where the clinkering process commences, so that the two processes succeed each other or even overlap or intermingle in the sense that certain particles may be undergoing decarbonization at points not too remote from other particles which are sintering or fritting to form the clinker. One reason for this may be that the clinkering operation, wherein the alkaline lime at high temperature unites with the acid silica and alumina, is, theoretically at least, an exothermic or heat evolving operation and, in any event, is one which does not involve appreciable absorption of heat, whereas the operation of driving off the carbon dioxid from the calcium carbonate, though occurring at a lower temperature, is an endothermic reaction which does involve great absorption of heat. It seems probable that a certain amount of the heat absorbing operation of driving off carbon dioxid is beneficial, inasmuch as its refrigerating effect must tend to temper the heat evolving operation of clinkering, and if this had no other effect, it would tend to localize the clinkering zone nearer the discharge end of the kiln, and thus to shorten the time between beginning of clinkering and discharge of the material from the kiln. This may be of considerable importance, insomuch as clinkering is a critical operation so far as concerns time and temperature. When performed in a rotary kiln, it requires that the material be raised to a temperature commonly supposed to be between 2500 and 3000 degrees Fahrenheit, in order that the union of the materials may be sufficiently complete and yet the temperature must not be too high or too long continued, or the material will be what is technically known as overburned.

In any event, I find it is advantageous to have some carbon dioxid ($CO_2$) evolved in the clinkering kiln, and the initial percentage is preferably such that under the special conditions of use, the last remnant of the $CO_2$ is driven off and the heat absorbing reaction terminated at the proper time to give the best results. An advantage of my method is that the initial percentage of uncalcined material necessary for this purpose in any given kiln, may be accurately predetermined. For any given percentage, the distribution or region of activity of its heat absorbing reaction may be further controlled by adjusting the heaviness of the feed and the rate of its travel therethrough. In general, it may be said that in all cases the clinkering by my method will be more rapid than by the old method with the uncalcined rock.

In the preferred practice of my method wherein I use previously calcined material containing only the required percentage of uncalcined rock, the work which the heat must do is similar in kind, though less in amount than the work which is performed in the last 20 or 30 feet of a rotary kiln operating by the old process on uncalcined material, so that for the practice of my method, the length of the kiln need be only that necessary to do the required amount of chemical work, plus the length necessary for heating up the materials to the calcining temperature. Hence, an old fashioned short kiln is amply adequate for my purposes, though a kiln 80 to 100 feet or more in length may be employed and is even desirable in case the material employed for my purposes contains an exceptionally large percentage of unburned or partially burned material.

Another feature of my invention consists in regulating the supply of the material to the upper end of the kiln and the rate of feed therethrough, so that the feed shall be heavy; that is to say, so that the amount of material lying on the upturning side of the kiln shall be equal to or greater than the amount of such material commonly found in the ordinary rotary kiln process, where uncalcined rock is used.

Another feature of my invention consists in burning the coal at the ordinary rate employed for raw uncalcined rock, or even at a considerably higher rate, and then utilizing the resulting heat by increasing the heaviness of the feed and the rate of travel of the material to a point where the increased amount of material operated upon, compensates for the decreased work which a given volume requires. In this way the full jet will supply no more heat than is necessary for the amount of material operated upon. This requires that the rate of travel of the material down the kiln be at least two and preferably three, or even four times as great as in the case of raw, uncalcined rock, though in each specific case the precise ratio will depend somewhat upon the percentage of unburned rock in my mixture, the latter depending, of course, upon how thoroughly and completely I burn the material in the upright kiln.

There is another feature of my invention which probably tends to account for my success. In the earlier days when the advantage of complete calcination in one burning and separate clinkering by another burning was first proposed, the jets used in the rotary kilns were either atomized oil jets or producer gas jets. The latter has always proved difficult of use for clinkering operations, because of the low heat intensity of the flame. On the other hand, the oil jets as used in rotary kilns have always been proportioned and designed to produce a very intense heat which would necessarily overburn the clinker unless restrained in some way, as by a dominant heat absorbing reaction continuing far down the kiln. I believe that this is one of the reasons why no one has ever succeeded in using this intensely hot flame for clinkering, except in connection with previously uncalcined, raw materials, which could be manipulated so as to distribute the heat absorbing decarbonization of the lime, to any extent.

One of the meritorious features of my invention consists in the discovery that one of the varieties of fuel and one of the forms of jet burner now in common use is suitable for the practical performance of the clinkering part of my process. The fuel which I use is very finely pulverized and carefully dried gas coal carrying approximately 30% to 38% volatile matter. This fuel is used in connection with a low pressure diffuse burner of the McAuley type, supplied with air by a rotary fan. I prefer this to the high velocity jet of the Hurry and Seaman's type, which is supplied from an air compressor, because with the low pressure type the flame is more localized at the lower end of the kiln. Moreover, the fuel itself has a comparatively narrow range of temperature, which extends entirely through the range of temperature necessary for clinkering, and yet does not extend far above that range. Thus it is easier to limit and temper the clinkering of my precalcined material to prevent serious overburning. It will be noted that the specific fuel and burner used and the method of its use contribute to localize the region of clinkering temperature close to the lower end of the kiln, thus operating in a manner tending to produce a general effect contributory to the above described effect of the carbon dioxid in the material in the upper portion of the kiln.

It will be seen that the percentage of $CO_2$, the nature of the fuel, the character and location of the jet, the heaviness of travel of the material, and the rate of the feed, are all factors which are governed and controlled with the view to preventing such excessive overburning of the clinker as would make my process impractical. Hence, the degree and extent to which the one expedient must be utilized will depend upon the extent and effectiveness with which the others are utilized, and considerable variation and substitution of one for the other to produce the same result will be possible and desirable under varying circumstances and conditions. It will be obvious that the present full disclosure of the various possible subsidiary or contributing factors will enable those skilled in the art to successfully utilize one or more of these factors to the exclusion of the others.

In attempting any such variations, considerable caution should be exercised, particularly in the matter of attempting to completely calcine the material before subjecting it to the final heat in the rotary kiln, because the absence of carbonic acid gas in the material wonderfully facilitates the operation in the rotary kiln, and at the same time the heat is necessarily very intense. Hence, unless great care is exercised in properly tempering and controlling the action of the heat, as by insuring the presence of some uncalcined rock or some other adequate heat absorbing work in the rotary kiln, the clinker may be overburned. In fact, the great facility with which completely decarbonized material becomes overburned in the rotary kiln, is one of the causes which has heretofore made the double burning operation practically impossible of successful performance, and it is with a view to controlling and tempering or localizing the clinkering, instead of with a view to facilitating it, that I have devised my present process wherein I make adequate use of some and preferably of all of the herein described tempering factors.

I will now describe an illustrative application of my process as practiced with certain specific raw materials: Raw material containing a high percentage of calcium carbonate, preferably fragmental lime rock, is calcined in any desired form of rotary or upright kiln, such as could be used for manufacture of lime, though an internally fired, continuous kiln of the Rosendale type has special advantages and may be employed, if desired. In either case, the amount of fuel employed, the rate of combustion, and the time of exposure of the material to the heat is predetermined so that the calcium carbonate will be approximately two-thirds to nine-tenths calcined, though it may be completely calcined, if desired. In certain cases, the burning may be in accordance with the best practice of lime burning, though for my purposes I find it cheaper to use one-half or two-thirds as much fuel, or else to charge and draw the kiln considerably faster, since the partial burning that can be thus effected is sufficient for my purposes.

In like manner, cement rock in fragments or lumps of the usual size may be calcined in any desired way, preferably in an upright kiln charged with alternate layers of rock and coal in accordance with the practice in burning Rosendale cement. In certain cases where the lime rock is completely calcined, the cement rock will be considerably underburned, while if the cement rock is completely calcined, the lime rock is preferably underburned, though it will be understood that both varieties of rock may be completely calcined, if desired.

In any event, the two kinds of rock are burned in different kilns, so that calcining operations may be independent and independently controlled. This makes it possible to independently control the amount of fuel and the duration and intensity of its combustion, so as to make the conditions in each kiln such as are most suited to the particular kind of rock burned in that kiln. Each kind of rock is charged into its kiln in layers, with a thin layer of coal over each layer of the rock. The amounts of material and proportions of the layers will vary according to the nature of the rock used and the completeness of the calcination desired. The amount of coal per barrel of the product may vary from, say, 25 pounds for soft rock up to 35 or 40 pounds for hard rock.

The cement rock may be burned so as to produce a product averaging about 45 to 50 per cent. lime, 25 to 30 per cent. silica, and 8 to 14 per cent. alumina, with about 10 per cent. of uncalcined rock, at an expense of no more than about 26 to 30 pounds of coal per barrel. In order to burn the lime rock sufficiently for my purposes, it is desirable to use somewhat more coal; but the amount of burned lime rock required is usually less than the amount of the cement rock with which it is mixed, and the combined material may be produced on a consumption of about 30 to 32 pounds of coal per barrel. Enough of the burned lime rock is used to form a mixture containing lime, silica, and alumina in proper proportion for making a fully limed Portland cement, the material being finely ground and thoroughly mixed. Material prepared in this way may be clinkered in an ordinary rotary kiln, which need not be of great length. In a particular case, an ordinary rotary kiln, 60 feet in length by 7 feet in diameter was used, though a very much shorter or longer kiln may be used in particular cases to suit the work to be performed. The kiln is preferably heated by a low pressure powdered fuel burner, such as is commonly used on such kilns for manufacture of Portland cement from raw unburned material.

In the particular case of a kiln of the above specified dimensions, the output of clinker when operated on raw uncalcined material in the ordinary way would average about 170 barrels per day, with a fuel consumption of 110 pounds of coal per barrel. When used to clinker the above described mixture, the burner was operated so as to burn a somewhat greater amount of coal per hour, and the amount of material fed into the kiln at the upper end was such that the output of clinker was approximately 525 barrels for my mixture clinkered by my process, as against 170 barrels, for the rock clinkered by the old process. The coal required in the rotary kiln for calcining the 10% of unburned stone and heating and clinkering all of it was found to be between 45 and 50 pounds per barrel. The kiln was rotated at slightly greater speed than usual, and the heaviness of the feed on the upturning side was greater than usual. The result of this test shows a consumption of 80 to 85 pounds of coal per barrel of the product, of which 30 to 35 pounds was comparatively inexpensive coal, costing about one-half as much as the cost of coal which would have been required if the calcining had been done in the rotary kiln by a pulverized coal jet. The actual cost for the fuel is about 55 to 60 per cent. of the cost for making similar cement by the old process, wherein all the calcining is done in the rotary kiln. The fine grinding of the hard rock required by the old process is more expensive than the grinding of my partially or wholly calcined material.

The particular grades of lime rock and of cement rock and the particular amounts of coal required in connection therewith are specified above merely by way of illustration of a specific case of the practice of my process, but it will be understood that these may be greatly varied in particular cases without departure from the spirit of my invention.

It will be observed that by properly proportioning the length of the kiln and the heaviness and rate of the feed to the amount of fuel burned, the work to be done upon the material by the heat may always be made to bear such relation to the time of exposure and to the distribution and intensity of the heat that the material will not reach the clinkering temperature until it has approached within a predetermined desired distance from the discharge outlet of the kiln, and thus the time of exposure to the clinkering temperature and the duration and intensity of the clinkering reaction may be accurately predetermined so as to secure the best results.

As I have above indicated, the work to be done includes the heating up of the material followed by the heat absorbing operation of driving off the water and any remaining carbon dioxid from such portion of the rock as has not been previously calcined. Though the calcination involves great heat absorption and is one of the most effective and easily applied expedients for tempering the process and preventing premature clinkering, it is not essential in all cases and it will be evident from the spirit of my prior disclosure, that if the feed is made sufficiently heavy and the agitation sufficiently rapid, and if these are properly proportioned to the rate of feed, the length of the kiln, and the intensity of the flame, so that all of the heat which can be transmitted to the material while traveling the required distance down the kiln, will be only sufficient to do the work of heating up the material to the clinkering temperature by the time it arrives within a suitable distance from the discharge end or outlet—in such case, the duration of the clinkering reaction may be predetermined and controlled even though the work done by the heat consists mainly in raising temperature of the materials without doing chemical work.

One of the advantages in making a part of the preliminary work done by the heat in the rotary kiln consist in the decomposition of calcium carbonate is that the reactions within the kiln at the lower end and the various attendant visible phenomena are more nearly analogous to those to which the ordinary cement burner has become accustomed in his prior experiences with rotary kilns, and hence he can more easily learn to gage the situation and to properly vary the conditions in the practice of my new process. Another great advantage is that the driving off of the last remnants of the $CO_2$ from the calcium carbonate requires a disproportionate amount of fuel when accomplished in the upright kiln, whereas the conditions in the rotary kiln are the best possible for completely and cheaply completing this work and the attendant heat absorption is there an advantage for the various reasons explained above.

In certain cases where the mere heating of thoroughly calcined and dehydrated materials would not furnish sufficient preliminary work and heat absorption in the rotary kiln, either because of the great length of the kiln, the slowness of the feed, or the intensity of the heat, the presence of the uncalcined constituent or its equivalent is especially desirable. In any case other kinds of preliminary work requiring the absorption of heat may be used in combination with or as a substitute for the calcining reaction. Among the other kinds of work suitable for this purpose may be mentioned the evaporation of free water introduced or remaining in the mixture, or preferably the dissociation of combined water of crystallization from silica, alumina, iron oxid, or clay, in which they may be contained; or the distilling off of potash, soda, or sulfur compounds. These latter reactions are especially effective in preventing overburning, insomuch as most of them occur at or near the clinkering point and involve chemical absorption of relatively large amounts of heat per unit weight. Hence, though the quantities may be very small, the tempering effect may be very noticeable.

Where the chemical work done in the rotary kiln is largely that of calcining of a remnant of calcium carbonate, this remnant may consist of a constituent either of the cement rock or of the lime rock. Where the lime rock and cement rock are calcined in separate kilns, it may be desirable to completely calcine the lime rock and to get the desired percentage of calcium carbonate by underburning the cement rock.

In certain cases, the lime rock and the cement rock or other raw materials may be completely calcined and dehydrated in the upright kiln, and then ground and mixed in proper proportions required for the Portland cement clinker. This material, requiring practically no chemical work to be performed in the rotary kiln, may then be modified or, as it were, loaded by the addition of a certain amount of previously prepared mixture of raw material calculated to furnish the required amount of calcining or other heat absorbing re-action in the rotary kiln. This furnishes a convenient method of standardizing the operations of the plant, since a standard raw mixture may be prepared which when added to the completely calcined mixture, will always give a standard, definite mixture to be acted upon by the heat in the rotary kiln. While this method of preparing the material is convenient and certain, it necessarily involves the expense of completing calcination of the major portion of the material in the upright kiln. Hence, I prefer in actual practice to underburn as uniformly as possible in the upright kiln, so as to get an approximately uniform product, and then to correct unavoidable variations by adding a variable amount of raw mixture.

In cases where it is found desirable to standardize the amount of heat absorbing work to be done in the rotary kiln, the raw mixture may be proportioned so as to contain the precise proportion of lime, silica, and alumina content required for the Portland cement, so that variable amount of such raw mixture may be added without varying the composition of the resulting clinker.

It will be understood that where standardization of the unburned content of the mixture is not attempted or is imperfect, the rate and heaviness of feed and the adjustment of flame and the amount of coal burned, may be varied so as to compensate for a considerable range of variation in the mixture.

So far as concerns the broader subject matter, all the steps of my process are independent of the specific form of the apparatus in which the operation is performed; hence, except as therein otherwise definitely specified, the claims for the process are not limited to the specific apparatus described in the specification. In certain of the claims wherein there is more or less definite specification of apparatus, it will be understood that the apparatus is referred to for the purpose of more easily defining the nature of the operation constituting the process, rather than with a view to including any specific apparatus as a feature of my invention.

In certain of the claims I have referred to predetermining or adjusting certain factors of the operation of the clinkering kiln, as, for instance, the rate of supply of material and the rapidity of rotation of the kiln, with respect to the pitch, diameter, and length of the kiln and to the distribution and intensity of the heat within the kiln and with respect to the work which must be done upon the material to bring it to the clinkering temperature. In these cases the language is such as might be taken to imply that those factors which are predetermined or adjusted are the only variable factors and that the factors with respect to which they are adjusted are fixed. This classification of the factors is convenient and natural insomuch as it assumes a properly proportioned plant already installed and ready for operation. Nevertheless, where it is desired that the practice of the process include the construction of a new plant or the alteration of an existing plant, the factors of "pitch, diameter, and length of the kiln" and the "distribution and intensity of the heat within the kiln" are equally convenient and desirable factors for variation or adjustment with reference to the others. "The work which must be done on the material to bring it to the clinkering temperature" is, of course, in all cases capable of variation by variation in the character of the constituents of the material. Hence, it will be understood that where certain of these factors are specified in the claims as variable or adjustable with respect to certain other factors, such claims are to be considered as covering a process wherein any one or all of said factors are varied, adjusted, or predetermined for the described purposes, with reference to any one or all of the other factors.

Lime rock and cement rock may be classed together for some purposes and separately for other purposes. In nature they are frequently found in adjacent strata of the same formation, and in certain cases they may more or less overlap and merge into each other, so that for present purposes the distinction between the classes may be considered as being largely functional with respect to the specific operation of making Portland cement. They both contain calcium carbonate and do not contain other materials in such amount and quantity as would have an objectionable effect on the components of the Portland cement clinker to be made therefrom. The lime rock may be substantially pure calcium carbonate, or it may include rock having a smaller percentage of lime, provided the amount be in excess of the proportions suitable for the manufacture of the desired quality of Portland cement clinker. Similarly, cement rock may be rock which contains within itself the proportions of lime, silica, and alumina suitable for calcining and clinkering to make hydraulic cement, or it may include similar rock containing lime, silica, alumina, etc., but having the percentage of lime too small for the desired quality of cement.

I claim:

1. The improvement in the art of making Portland cement, which consists in burning a plurality of kinds of raw material independently, one kind capable of yielding a burned product containing a percentage of alkaline base greater than desired for the Portland cement clinker, and another kind capable of yielding a burned product containing a percentage of the acid salts greater than desired for Portland cement clinker; grinding said product and utilizing the same in proper proportions to form material containing the alkaline base and the acid salts in the proportion required for the quality of cement desired; feeding said material into a rotary kiln; generating in said kiln a temperature sufficient to effect the clinkering of the material at the lower end thereof; and predetermining or adjusting the rate of supply of the materials and the rapidity of rotation of the kiln with respect to the pitch, diameter, and length of the kiln and to the distribution, quantity and intensity of the heat within the kiln and with respect to the work which must be done on the material to bring it to the clinkering temperature, for the purpose of controlling the heaviness of the feed and the exposure of the material to the heat and thereby controlling the clinkering reaction, substantially as described.

2. The improvement in the art of making Portland cement, which consists in burning different qualities of rock by independent operations, the amount of fuel, its rate of combustion and the method and extent of its application being in each case determined and controlled with reference to the physical and chemical qualities of each respectively; grinding the product and preparing therefrom a mixture containing lime, silica, etc., in proportions suitable for cement; feeding said material into a rotary kiln; generating in said kiln a temperature sufficient to effect the clinkering of the material at the lower end thereof; and predetermining or adjusting the rate of supply of the materials and the rapidity of rotation of the kiln with respect to the pitch, diameter, and length of the kiln and to the distribution, quantity and intensity of the heat within the kiln and with respect to the work which must be done on the material to bring it to the clinkering temperature, for the purpose of controlling the heaviness of the feed and the exposure of the material to the heat and thereby controlling the clinkering reaction, substantially as described.

3. In the art of making Portland cement, the method which consists in separately calcining lime rock and cement rock by independently controlled methods suited to the different physical and chemical qualities of the two kinds of rock; grinding the product and preparing therefrom a mixture containing lime, silica, etc., in proportions suitable for cement; subjecting said material to the action of heat in a region maintained at a temperature sufficient to effect the clinkering of the material and predetermining or adjusting the rate of supply of the material to said region and the rate of its travel therethrough and the resulting heaviness of feed and extent of the exposure of the material with respect to the distribution, quantity and intensity of the heat within said region and with respect to the work which must be done on the material to bring it to the clinkering temperature, for the purpose of controlling the clinkering reaction, substantially as described.

4. In the art of making Portland cement, the method which consists in separately calcining lime rock and cement rock by independently controlled methods suited to the different physical and chemical qualities of the two kinds of rock and to the degree of calcination desired for each; grinding the product and preparing therefrom a mixture containing lime, silica, etc., in proportions suitable for cement; feeding said material into a rotary kiln; generating in said kiln a temperature sufficient to effect the clinkering of the material at the lower end thereof; and predetermining or adjusting the rate of supply of the materials and the rapidity of rotation of the kiln with respect to the pitch, diameter, and length of the kiln and to the distribution, quantity and intensity of the heat within the kiln and with respect to the work which must be done on the material to bring it to the clinkering temperature, for the purpose of controlling the heaviness of the feed and the exposure of the material to the heat and thereby controlling the clinkering reaction, substantially as described.

5. The improvement in the art of making Portland cement, which consists in separately calcining fragmental lime rock and cement rock by independent operations, the amount of fuel, its rate of combustion and the method and extent of its application to the several varieties of rock, being in each case determined and controlled with reference to the different qualities of the several varieties of rock and to the proportion of undissociated material desired in the product; grinding the product and preparing therefrom a mixture containing lime, silica, etc., in proportions suitable for cement; and clinkering said material in a rotary kiln, for the purpose described.

6. The improvement in the art of making Portland cement, which consists in separately calcining fragmental lime rock and cement rock by independent operations, the amount of fuel, its rate of combustion and the method and extent of its application to the several varieties of rock, being in each case determined and controlled with reference to the different qualities of the several varieties of rock; grinding the product and preparing therefrom a mixture containing lime, silica, etc., in proportions suitable for cement; feeding said material into a rotary kiln; generating in said kiln a temperature sufficient to effect the clinkering of the material at the lower end thereof; and predetermining or adjusting the rate of supply of the materials and the rapidity of rotation of the kiln with respect to the pitch, diameter, and length of the kiln and to the distribution, quantity and intensity of the heat within the kiln and with respect to the work which must be done on the material to bring it to the clinkering temperature, for the purpose of controlling the heaviness of the feed and the exposure of the material to the heat and thereby controlling the clinkering reaction, substantially as described.

Signed at New York city, in the county of New York and State of New York, this twenty-eighth day of April, A. D. 1908.

WILLIAM H. HARDING.

Witnesses:
IRVING M. OBRIEGHT,
ANITA BURKE.